United States Patent [19]

Mauri

[11] 4,059,303
[45] Nov. 22, 1977

[54] LIGHT ALLOY BODY STRUCTURE, PARTICULARLY FOR TRANSPORT VEHICLES, AND A PROCESS FOR ITS FORMATION

[76] Inventor: Ambrogio Mauri, Via Garibaldi, 254, Desio, (Milan), Italy

[21] Appl. No.: 663,163

[22] Filed: Mar. 2, 1976

[51] Int. Cl.² .............................................. B62D 33/00
[52] U.S. Cl. .................................... 296/28 M; 29/469
[58] Field of Search ..................................... 296/28 M

[56] References Cited
U.S. PATENT DOCUMENTS

| 2,877,508 | 3/1959 | Ewart | 296/28 M |
|---|---|---|---|
| 3,034,824 | 5/1962 | Schubach | 296/28 M |
| 3,834,575 | 9/1974 | Carr | 296/28 M |

Primary Examiner—Philip Goodman
Attorney, Agent, or Firm—Guido Modiano; Albert Josif

[57] ABSTRACT

A light alloy body structure for transport vehicles, including a top structure and said structures fixed along longitudinal edges of the top structure extending transverse thereto. At each of the two longitudinal edges of the top structure of the vehicle a composite longeron member is provided having a curved cross-section. The longeron member consists of two mating elongated shaped members rigidly connected to each other along longitudinally extending mating surfaces thereof and connecting the top structures with the respective side structure of the body structure of the vehicle.

2 Claims, 7 Drawing Figures

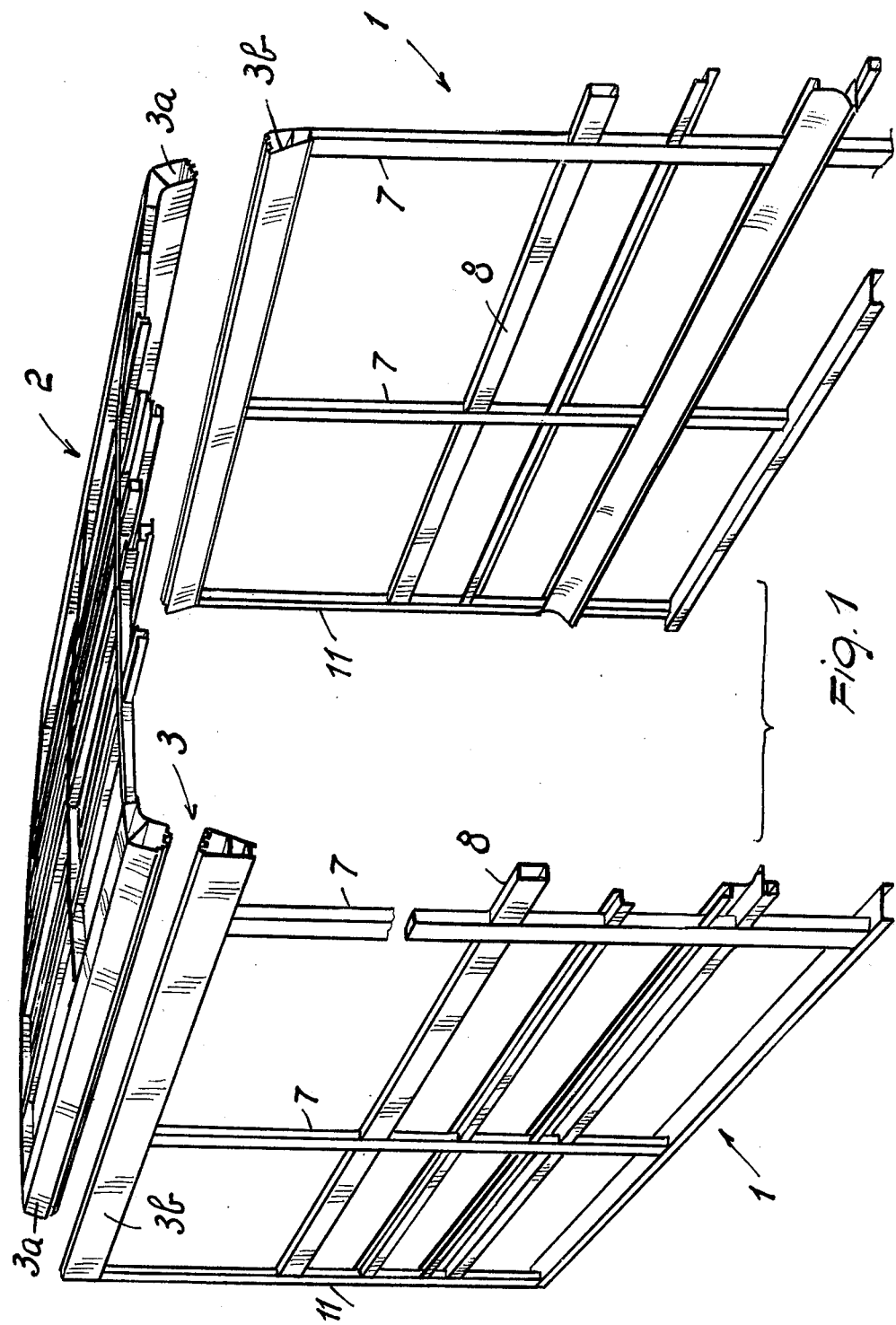

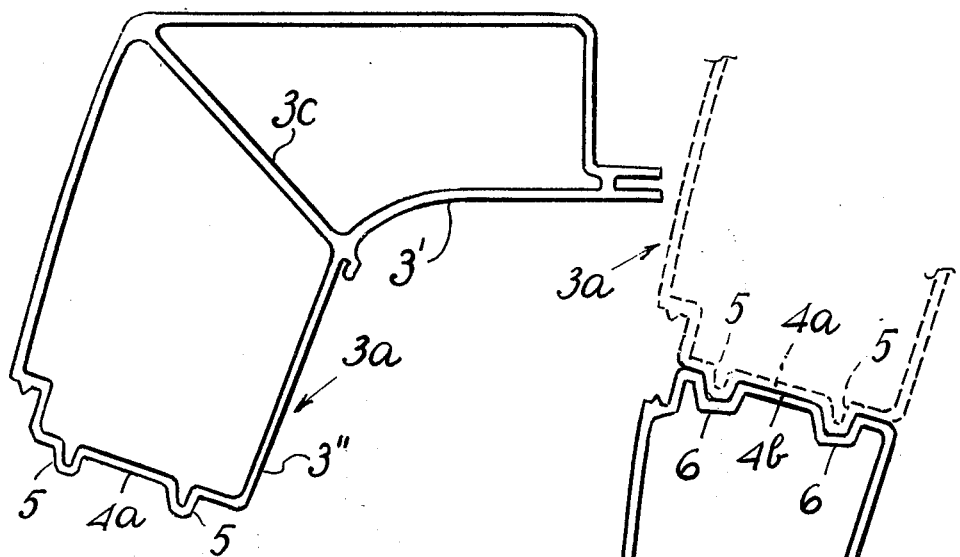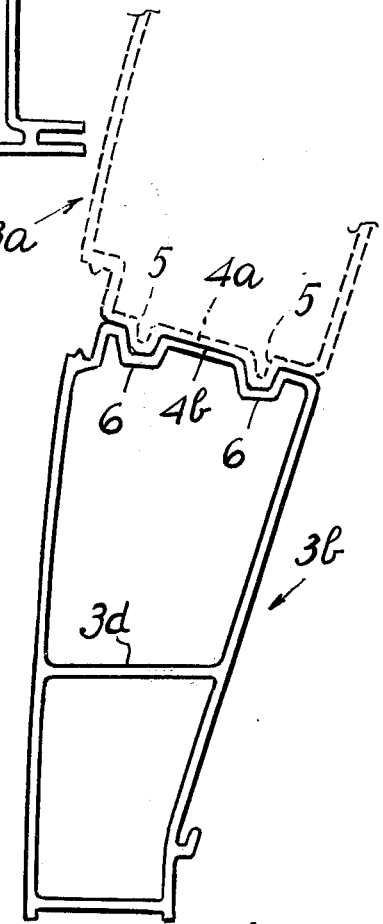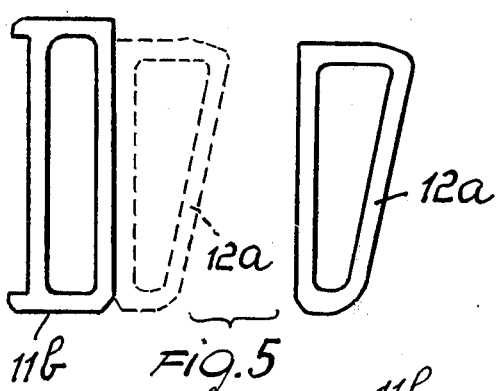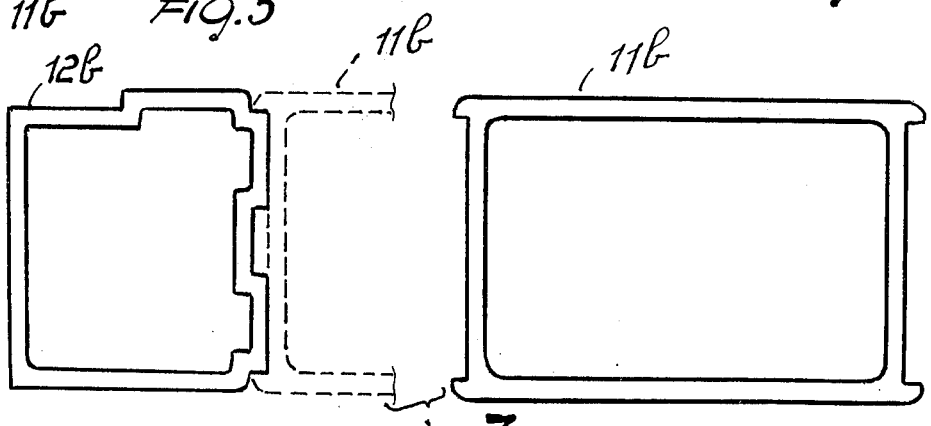

LIGHT ALLOY BODY STRUCTURE, PARTICULARLY FOR TRANSPORT VEHICLES, AND A PROCESS FOR ITS FORMATION

BACKGROUND OF THE INVENTION

This invention relates to a light alloy body structure, particularly for transport vehicles such as buses, coaches and the like, and a process for its formation.

Aluminium buses and coaches, i.e. those provided with a load bearing or semi-load bearing aluminium body, have notably been constructed for some time. These buses and coaches offer numerous advantages over those constructed for example of steel. Their body is both very resistant to corrosion, therefore requiring minimum maintenance, and long-lasting, so allowing certain ammortization of the initial construction costs. Furthermore the aluminium body leads to a considerable lightening of the total weight of the vehicle structure, resulting either in greater loading or, for equal loads, greater engine efficiency and lower fuel consumption. The aluminium body has also proved to be particularly useful and effective in collisions, as it has greater facility for absorbing impact than similar structures of steel.

Up to the present time these bodies, or rather the structures forming the body framework, have been constructed integrally in a single block during assembly. Thus the base frame has been formed by joining together a series of suitably shaped sections, bars or laths during assembly, to gradually form the body shape. This shape is evidently three dimensional and very complicated, so that the construction of the body base frame has been particularly laborious and costly, due to the time required and the cost which this implied. Furthermore, such a process has had the disadvantage of requiring demanding repair work in the case of collision or structural damage, as nearly all the body elements are interdependent.

SUMMARY OF THE INVENTION

The main object of the present invention is to provide a light alloy body structure which is particularly simple, economical and rugged, and is easily constructed by manufacturers in this field.

A further object of the present invention is to provide a structure which if damaged may be easily repaired or partially replaced, so reducing material wastage to a minimum. A further object is to provide a rugged structure particularly resistant to impact.

A further object is to provide a body forming process which is extremely rapid, simple and economical, because of the time saved.

These and further objects which will be more evident hereinafter are attained by a light alloy body structure particularly for transport vehicles, according to the invention, including a top structure and side structures fixed along longitudinal edges of the top structure extending transverse thereto, characterized in that it comprises at each of the two longitudinal edges of the top structure of the vehicle a composite longeron member having a curved cross-section, said longeron member consisting of two mating elongated shaped members rigidly connected to each other along longitudinally extending mating surfaces thereof and connecting the top structure with the respective side structure of the body structure of the vehicle.

BRIEF DESCRIPTION OF THE DRAWINGS

Further characteristics and advantages of the invention will be more evident from the description of a preferred but not exclusive embodiment of the structure, illustrated by way of non-limiting example in the accompanying drawings in which:

FIG. 1 is a perspective overall view of the structure of the central part of the body;

FIGS. 2 and 3 are cross-sections through the two shaped members shown in FIG. 1, indicating also by means of dashed lines how these shaped members are positioned together;

FIG. 5 is a cross-section through two vertical shaped members along which the end and central part of the body are joined, the positioning of these shaped members being indicated by dashed lines;

FIG. 7 is a cross-section through two vertical shaped members along which the rear end and central part of the body are joined, the mutual positioning of said shaped members being indicated by dashed lines.

DESCRIPTION OF THE PREFERRED EMBODIMENTS

Figure 4:
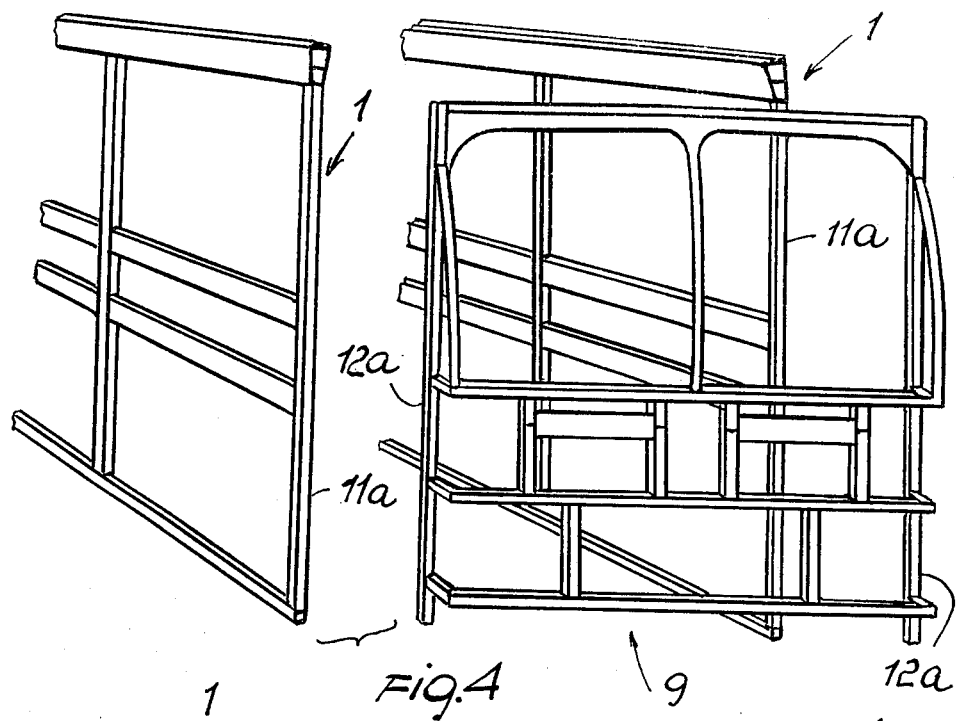
FIG. 4 is a diagrammatic perspective view of the front end structure of the body.

With reference to the said figures, the structure comprises a pair of sides 1 forming the side walls of the vehicle body, and a top 2, the vehicle roof, joined to the sides 1 at the upper lateral edges of the vehicle body. According to the invention the top 2 and sides 1 are joined by longeron members 3, having a curved cross-section, each of which is divided longitudinally into two elongated shaped hollow box sections members, namely a first shaped member 3a rigid with the top 2 and a second shaped member 3b rigid with a side 1. The shaped members 3a and 3b are brought together and rigidly connected along two mating faces, for example by welding. These mating faces, 4a on the first shaped member 3a and 4b on the second shaped member 3b respectively, are tongue and groove shaped, the face 4a comprising ribs 5 insertable into grooves 6 formed in the face 4b. The shaped members 3a and 3b are subdivided, as clearly shown in FIGS. 2 and 3, into cells separated by a reinforcing cross-piece like web 3c, 3d respectively which extend longitudinally over the entire length thereof.

It will be appreciated from FIG. 2 that the shaped hollow box section member 3e has an upper portion 3' in substantial alignment with the top structure 2 (FIG. 1) and a lower portion 3" in substantial alignment with contiguous the side wall structure 1.

In an intermediate position, the sides 1 comprise tubular uprights 7 of constant rectangular cross-section. Partly tubular cross members 8 of rectangular cross-section are positioned and fixed between these uprights 7. The sides 1 are bounded at their lateral edges by vertical hollow terminal box-section member uprights 11, the purpose of which will be explained hereinafter. Further characteristics of the structure of the sides 1 and top 2 are not described in the present patent as they form part of the known art, well familiar to those skilled in the art.

Figure 6:
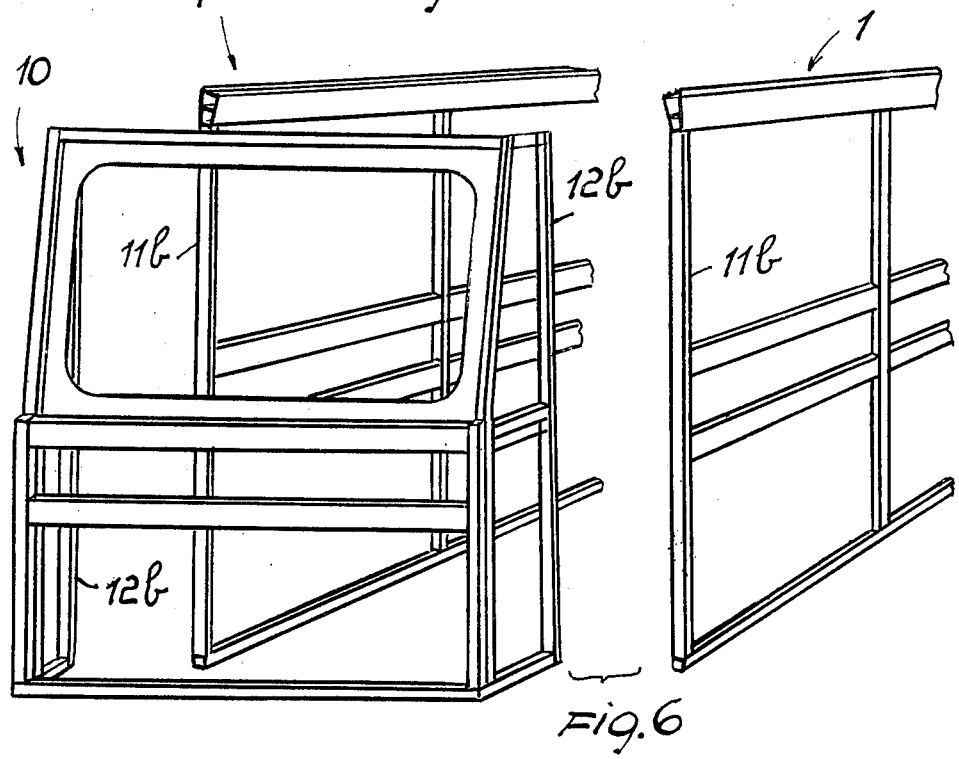
FIG. 6 is a perspective view of the rear end of the body.

The body structure is completed by a front end wall structure 9 (FIG. 4) and a rear end wall structure (FIG. 6) defining the front and rear of the vehicle respectively. These ends 9 and 10 are constructed in known manner and will therefore not be described in detail here. One essential characteristic should however be mentioned, namely that both the front end 9 and rear 10 comprise vertical terminal shaped members 12 at their zone of joining to the sides 1. These terminal shaped members 12 may be inserted into said terminal uprights 11 and welded, for example by spot welding, the front terminal shaped hollow box-section upright members 12a of the front end 9 being inserted into the front terminal uprights 11a (FIG. 5), and the rear terminal shaped hollow box-sections upright members 12b being inserted into the rear terminal uprights 11b (FIG. 7). Thus the jointing assemblies between the ends 9 and 10 and sides 1 are also divided.

The present invention also provides a process for forming the light alloy body of a transport vehicle. This process consists of a number of steps. In a first step all the elements necessary for forming the sides 1, top 2 and front end 9 and rear end 10 are prepared. In a second step the sides 1, top 2 and ends 9 and 10 are constructed independently, possibly at different times and in different places. In a third step the top 2, sides 1 and ends 9 and 10 are joined by rigidly connecting together the shaped members 3a and 3b, for example by welding, to form the main frame members 3, and likewise connecting together the terminal shaped members 12 and terminal uprights 11.

The invention so conceived attains the proposed objects. In this respect, the structure is very robust as composite construction of the longeron member and vertical edge assemblies increases the strength of the elements thus divided, and is also advantageous in the case of impact, not only because of the greater sturdiness but also because if one side, one end or the top is dented, the damaged part may be replaced without having to interfere with the structures not directly concerned with the damage. This is evidently also valid in the case of maintenance or when it is desired to change some characteristic of the vehicle. Operations may be performed much more rapidly and economically on the vehicle body. Furthermore a process has been provided which extremely simplifies construction of the body and brings it within general capability. In this respect, its individual elements may be constructed independently in a much simplified manner and then joined together extremely rapidly, so considerably reducing assembly and manufacturing costs.

Such a forming process allows standardization of the structures and component elements.

The invention is susceptible to numerous modifications, all of which fall within the scope of the inventive idea. Furthermore all details may be replaced by technically equivalent elements.

In practice the materials and dimensions may be chosen according to requirements.

I claim:

1. A light alloy body structure having a longitudinal extension, a widthwise extension and an upward extension, particularly for transport vehicles, including a top structure having opposite composite longitudinal side edge longeron members, opposite side wall structures fixed respectively on said composite longitudinal side edge longeron members, a front wall structure and a rear wall structure, wherein said composite side edge longeron members comprise each a first and a second elongated shaped hollow box section member having each a reinforcing inner cross-piece like web, a mating longitudinal edge surface on each of said box section members facing each other and having longitudinally extending mating tongue and groove formations for rapid assembling and for rigid mutual connecting therewith, said first shaped hollow box section member having a generally arcuated cross-section with an upper and a lower portion, said upper portion extending in alignment with said top structure and being rigidly connected therewith thereby to form a rigid unit therewith, said lower portion extending in alignment with the respective side wall structure and being rigidly connected therewith thereby to form a rigid unit therewith and means for rigidly connecting said front wall structure and said rear wall structure with said opposite side wall structures.

2. A body structure according to claim 1, wherein said means for rigidly connecting said front wall structure and said rear wall structure with said opposite side wall structures respectively, comprise, at each corner defined by a side wall structure and a front wall and rear wall structures respectively, a first terminal hollow box section member upright rigidly connected with one edge portion thereof to the respective side wall structure and having a first mating surface and a second terminal hollow box section member upright rigidly connected to one among said rear wall and front wall structures respectively and having a second mating surface facing said first mating surface and rigidly connected thereto.

* * * * *